United States Patent [19]

Tartal

[11] Patent Number: 5,122,285
[45] Date of Patent: Jun. 16, 1992

[54] POOL CLEANING METHOD AND APPARATUS

[76] Inventor: James J. Tartal, 411 Teel Rd., Beckley, W. Va. 25801

[21] Appl. No.: 535,593

[22] Filed: Jun. 11, 1990

[51] Int. Cl.⁵ .......................................... B01D 21/26
[52] U.S. Cl. .................................. 210/787; 210/801; 210/803; 210/169; 210/416.2; 15/1.7; 15/341; 15/344; 4/490; 417/551; 134/34
[58] Field of Search ............... 210/787, 801, 803, 169, 210/416.2; 15/1.7, 341, 344; 4/490; 417/551; 134/34

[56] References Cited

U.S. PATENT DOCUMENTS

| | | | |
|---|---|---|---|
| 971,044 | 9/1910 | Hutchinson | 15/341 |
| 1,019,633 | 3/1912 | Hadjispiridis | 15/341 |
| 1,101,541 | 6/1914 | Harrington | 15/1.7 |
| 1,233,928 | 7/1917 | Small | 15/344 |
| 1,637,423 | 8/1927 | Miller | 210/169 |
| 2,473,066 | 6/1949 | Miller | 15/344 |
| 3,258,801 | 7/1966 | Campbell | 15/1.7 |
| 3,820,182 | 6/1974 | Vockroth | 210/172 |
| 4,094,031 | 6/1978 | Cellini | 15/1.7 |
| 4,584,733 | 4/1986 | Tietge et al. | 15/1.7 |
| 4,724,566 | 2/1988 | Fawcett | 15/1.7 |
| 4,733,427 | 3/1988 | Conrad | 15/1.7 |
| 4,742,592 | 5/1988 | Addona, Sr. | 15/1.7 |
| 4,896,392 | 1/1990 | Hull et al. | 15/1.7 |
| 4,935,980 | 6/1990 | Leginus et al. | 15/1.7 |

FOREIGN PATENT DOCUMENTS 2168244A 12/1986 United Kingdom .

Primary Examiner—Peter Hruskoci
Assistant Examiner—Robert J. Popovics
Attorney, Agent, or Firm—Richard C. Litman

[57] ABSTRACT

A pool cleaning method and apparatus in which a vortex is generated to concentrate foreign material at the center of the pool. The vortex can be generated by a pool scrubbing procedure carried out in a systematic manner. The scrubbing and vortex inducing procedure can be carried out by manual means. Large particulate matter is thus suspended in the vortex center and can be removed from the pool with a commercially avaiable strainer. Fine particulate sediment is then removed from the pool center by a manually reciprocated suction device which draws debris laden water from the floor of the pool through a disc shaped filter which retains microscopic particulates. Filtered water is then ejected through the top of the device's barrel assembly.

3 Claims, 3 Drawing Sheets (SECTION A-A)

(SECTION B-B)

POOL CLEANING METHOD AND APPARATUS

FIELD OF THE INVENTION

This invention relates to an improved method for cleaning a swimming pool.

BACKGROUND OF THE INVENTION

The problem of keeping swimming pools clean has traditionally been addressed by the continuous operation of a circulating pump and filter system. In addition to the initial cost of the pump and filter system, this approach also requires special filter sand or cartridges, extension hoses and electrically powered vacuum equipment. This poses a potential electrical safety problem and the continuous power requirement is expensive and contributes to environmental pollution.

Accordingly, it would be of great benefit to replace this continuous process with a less expensive batch or periodic process. Further energy savings and environmental benefits would accrue if such periodic cleaning could be accomplished solely with manual equipment. However a manual approach to pool cleaning has generally been considered unsatisfactory because of the time and effort required to collect foreign matter from a large area.

DESCRIPTION OF THE PRIOR ART

Miller has proposed, in U.S. Pat. No. 1,637,423, the generation of a vortex in a swimming pool to concentrate foreign matter to the center. The Miller patent discloses a mechanical process for generating a vortex in a pool with rounded corners. Foreign matter is thereby concentrated at the center of the pool and allowed to settle out of the water passing into a centrally located sump. However, the Miller device is designed to operate continuously even when the pool is in use. Therefore, the currents generated must of necessity be weak and the vortex effect thereby reduced. Additionally, this continuous mechanical process requires significant energy consumption.

Tietge et al., in British Patent GB 2,168,244A, disclose a manually operated suction device for gathering scum and debris from swimming pools. A manually reciprocable piston assembly draws debris laden water through a filter bag. The filter bag is of translucent flexible material. The specification does not require that the filter material be capable of separating out fine silt particles. The filter bag must be removed from the apparatus, emptied, and reinstalled according to an awkward procedure after each use. The bag is also prone to working loose from its mountings and to tearing in use.

Vockroth, in U.S. Pat. No. 3,820,182, discloses another suction device with a manually reciprocable piston for cleaning a swimming pool. Debris laden water drawn through the device passes through an external filter bag before being returned to the pool. The filter bag material of this device will trap fine silt particles and algae. However, the other disadvantages of the Tietge patent apply equally to this device. Additionally, the drawstring closure arrangement for the filter bag is ineffective in providing a positive seal to unfiltered water.

Both the Tietge and the Vockroth inventions require the use of awkward and cumbersome filter bag arrangements because they are designed to process a large volume of water with a high concentration of large diameter particulates. This necessitates a high filter surface area to prevent the devices from clogging.

SUMMARY OF THE INVENTION

The invention relates to an improved method and apparatus for cleaning a pool. The method allows for a pool with at least a partially curved periphery to be kept clean by a thorough periodic cleaning as opposed to the continuous methods generally employed. In addition, the method can be performed easily and efficiently using the completely manual apparatus illustrated in the preferred embodiment. The method is ideally adapted for cleaning pools known as vinyl liner pools, that is pools that are placed above ground and are usually circular in shape with a flat horizontal bottom and a supporting frame constructed of metal or the like into which a water tight vinyl sheet is placed. However, the method can be adapted to any pool or spa or any like body of enclosed fluid with at least a partially curved periphery and either a flat bottom or a bottom sloping to the center. This method can replace the costly pump and filter systems normally used in such pools or can be used as an adjunct to such a system.

The cleaning method is a three stage process. In the first stage a scrubbing apparatus is used to loosen foreign material from the sides and bottom of the pool. Then a water vortex is formed in the pool. In the preferred embodiment steps one and two are carried out simultaneously. That is the scrubbing process is carried out manually in a systematic manner so as to simultaneously form a water vortex at the center of the pool. A vortex of sufficient intensity will concentrate substantially all of the loosened foreign particulate material to the center of the pool. It has been found that in using an ordinary push broom to carry out the systematic scrubbing procedure, a vortex of sufficient intensity can be induced with no extraordinary effort.

Then in the third stage, the foreign particulates are removed from the center of the pool where they are now concentrated. First, the large particulates which are suspended in a small swirl—a forced vortex—are removed with a strainer device. Then the vortex is allowed to degrade. Fine particulates will, therefore, settle to the bottom at the center of the pool. The fine particulates are then removed from the pool with a suction device.

Because the vortex effect concentrates and suspends large particulates at the center of the pool, they may be removed with a commercially available pool strainer. The suction device of the invention is only required to remove the remaining fine particulates from a discrete area in the center of the pool and therefore, does not require the large filter surface area of previous art devices. Although dimensions are not given for the device as they will vary depending on the dimensions of the pool or spa to be cleaned, it will be understood that for a given pool size the capacity of the suction device may be significantly reduced from that required of prior art devices.

Accordingly, one of the objects of the present invention is to provide an improved method of cleaning pools.

Another object of the invention is to provide a pool cleaning method which utilizes a periodic versus a continuous process.

A further object of the invention is to provide an improved method of cleaning pools which can be accomplished solely with manual apparatus.

Still another object of the invention is to provide a manually operated suction device for cleaning pools which is simple in construction, easy to operate and clean, and which can separate fine particulates from the pool water.

It is another object of the invention to provide a manually operated suction device for cleaning a swimming pool which includes an in-line filter element capable of separating fine particulates down to five microns in diameter from the pool water which element is readily installed, removed and cleaned and which provides a reliable seal to the unfiltered water.

With these and other objects in view which will more readily appear as the nature of the invention is better understood, the invention consists in the novel method and combination and assembly of parts hereinafter more fully described, illustrated and claimed with reference made to the attached drawings.

DESCRIPTION OF THE PREFERRED EMBODIMENT

A liquid vortex can be induced in an enclosed fluid, in which the enclosure has at least a partially curved periphery, and particulate matter will tend to settle out to the center of the vortex as described in Miller supra, herein incorporated by reference.

Figure 1:
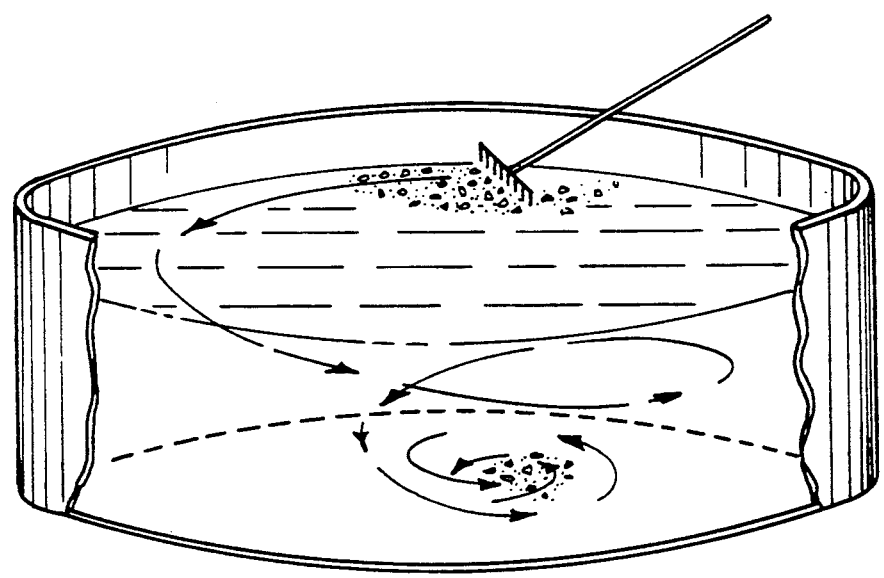
In FIG. 1 is shown the practice of the invention in which the scrubbing device is used to simultaneously remove foreign material from the sides and bottom of the pool and to create a vortex at the center of the pool.
Figure 2:
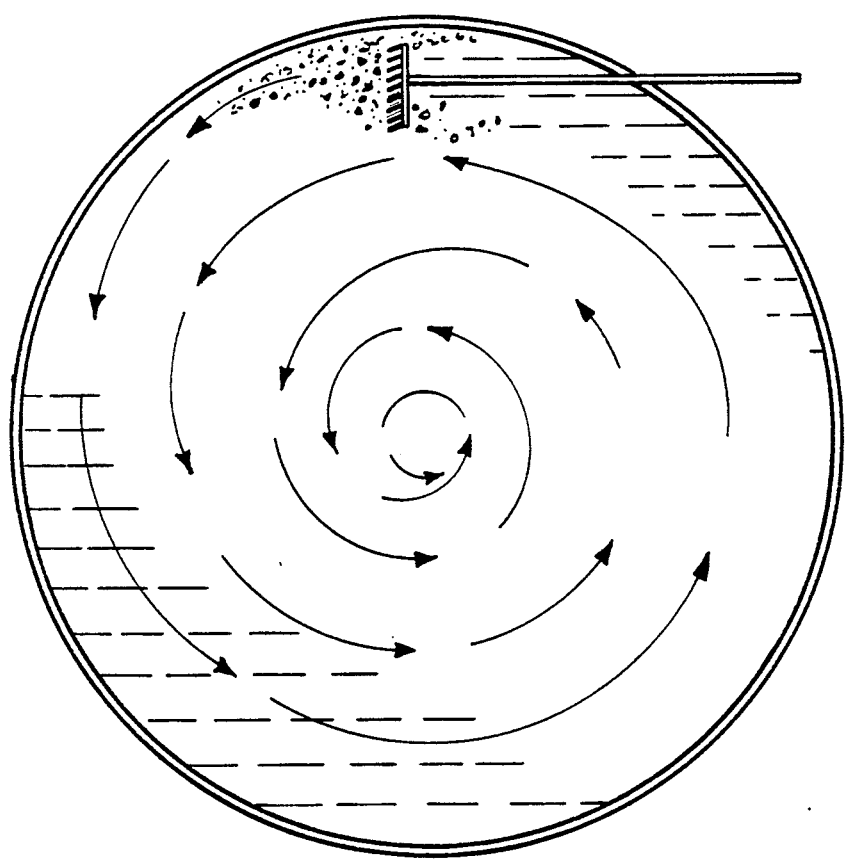
FIG. 2 is a top view of the practice of the invention shown in FIG. 1.

In the practice of the invention a scrubbing apparatus, such as a push broom type implement, is employed as shown in FIG. 1 and FIG. 2. The broom is used in a precise unidirectional pattern to simultaneously accomplish two functions—the mechanical removal of foreign particulates from the sides and bottom of the pool, and the formation of a vortex to concentrate the foreign matter to the center of the pool. This is accomplished by beginning at a top edge of the pool and continuing to sweep in one direction—clockwise or counterclockwise—in a downwardly descending spiral pattern down the sides of the pool and then in a spiral toward the center at the, bottom of the pool, thereby loosening all dirt and foreign particles from the total inside surface area of the pool. When the sweeping process is completed, the vortex is allowed to build.

Figure 3:
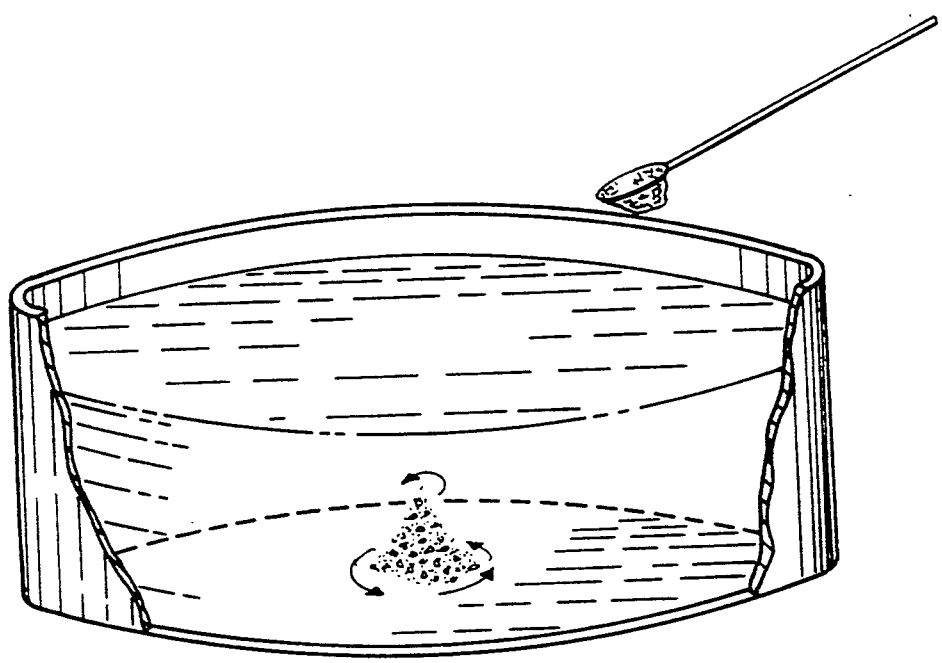
In FIG. 3 is shown the practice of the invention in which a strainer device is used to remove large suspended particulates from the vortex center.

As illustrated in FIG. 3, a commercially available pool straining device is then used to remove the large particulate matter which is now suspended in the center of the vortex.

The vortex is then allowed to naturally degrade. The remaining fine particulate sediment will, therefore, settle out at the center of the pool.

Figure 4:
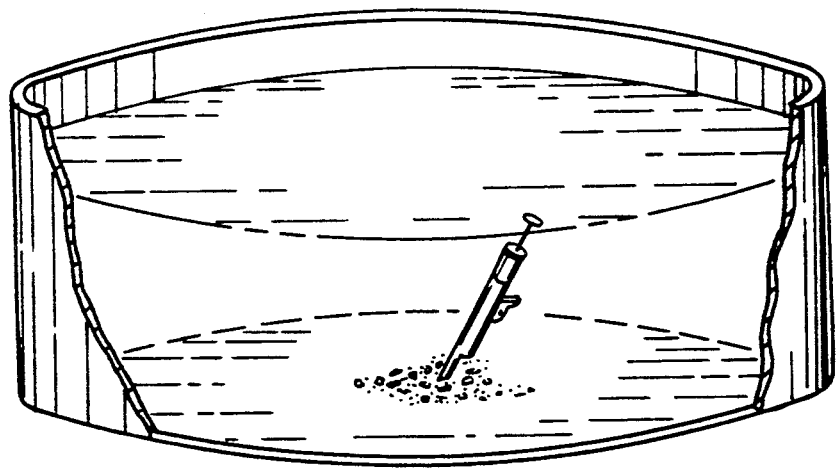
In FIG. 4 is shown the practice of the invention in which the suction device of the invention is used to remove fine particulate sediment settled from the swimming pool center.

As illustrated in FIG. 4, the suction device is then used to remove the fine particulate sediment from the center of the pool.

Figure 5:
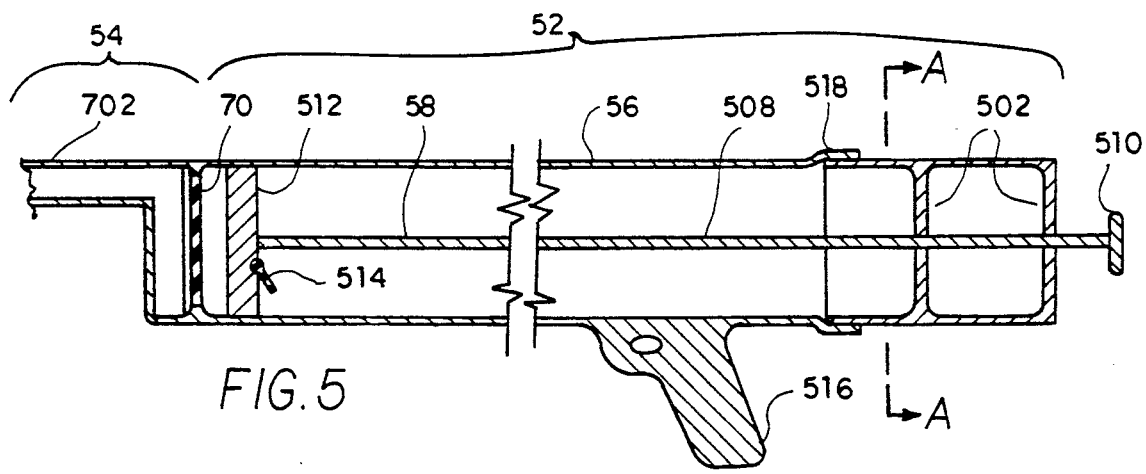
FIG. 5 is a longitudinal cross-sectional view of the suction device of the preferred embodiment.

FIG. 5 is a cross-sectional view of the swimming pool suction device showing the several elements and their relationship one to the other.

The elements of the device are assembled into the pump assembly 52 and the inlet assembly 54 which is removably attached to the end of the pump assembly.

Figure 6:
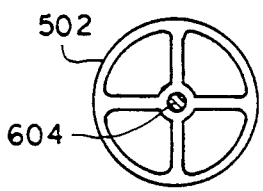
FIG. 6 is a top sectional view taken along line A—A of the suction device of the preferred embodiment.

The pump assembly 52 consists of a barrel subassembly 56 and a piston subassembly 58. The barrel subassembly 56 is an elongated cylindrical member with an open spoked top 502. The top sectional view taken along line A-A in FIG. 6, shows the central rod guide 604.

The piston subassembly 58 consists of piston rod 508 attached at one end to rod handle 510 by screw and thread fastening and at the other end connected to piston 512 by a lock nut and washer assembly 708 shown in FIG .7. The piston 512 incorporates an upward opening check valve structure 514 shown in greater detail in the sectional view taken along line B—B in FIG. 8.

Returning to FIG. 5, the barrel 56 has a snap-fit separation joint 518 for maintenance access to piston rod 508.

Figure 8:
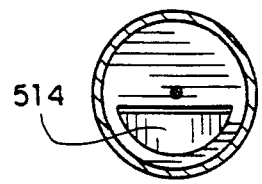
FIG. 8 is a top view sectional view taken along line B—B of the upper valve of the suction device in the preferred embodiment.
Figure 7:
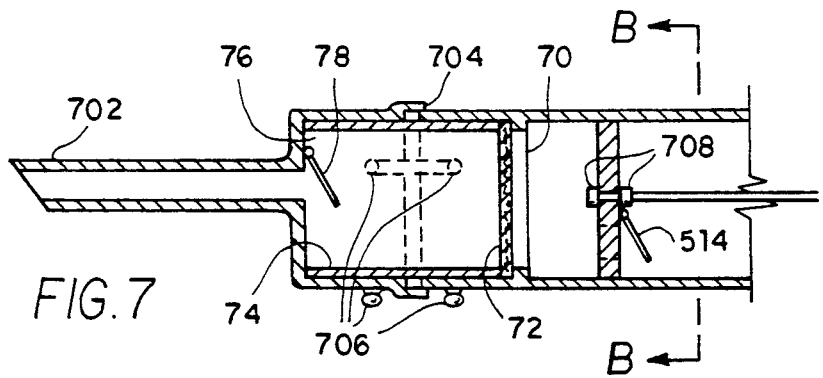
FIG. 7 is an enlarged cross-sectional view of the valve, liner and filter element of the suction device in the preferred embodiment.

Turning to FIG. 7, inlet assembly 54 is shown in greater detail. Ribbed plunger stop 70 is also the upper retaining means for filter disc 72. The lower retaining means for filter disc 72 is the sleeve insert 74. The sleeve insert 74 is a cup shaped member with upper face shaped as shown in FIG. 8 to support filter disc 72. The sleeve insert 74 fits into the inlet collar 76 and encloses the upwardly opening hinged inlet valve assembly 78 which overlies the inlet nozzle 702.

The inlet assembly 54 is separably connected at gasket 704. Plastic studs 706 on the upper and lower sections of the inlet assembly 54 are connected by conventional elastic fasteners to seal the unit.

The suction device of FIG. 5 and FIG. 7 is operated by manually reciprocating the piston rod 508 by use of the handle 510.

Figure 9:
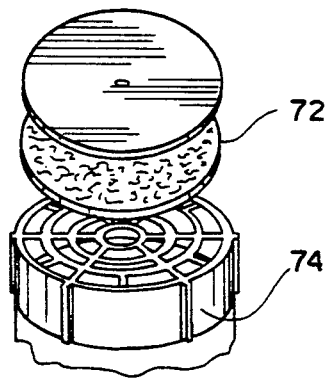
FIG. 9 is an enlarged, exploded view of the filter element and the upper support surface of the liner element of the suction device in the preferred embodiment.

As the piston 512 is reciprocated upwardly in barrel 56 suction is created drawing water and foreign matter upward through nozzle 702 and check valve 78. The water and foreign matter is then drawn upward through the liner insert 74 upper support face shown in FIG. 9. Any large particulates remaining from the straining step illustrated in FIG. 3 will be retained by the upper face of sleeve insert 74. The water then passes through filter disc 72 which separates out the fine particulates. Filtered water then fills barrel 56.

On the downward stroke, piston check valve 514 is forced open by the water in barrel 56. The piston 512 continues downward to piston stop 70.

On the next upward stroke, piston check valve 514 will close against the pressure of the retained filtered water in barrel 56. As the piston 512 proceeds upward, therefore, the filtered water will be ejected through the open top member 502.

The procedure is repeated until all the settled particulate matter at the center of the pool is removed.

When pool cleaning is completed, the inlet assembly 54 is separated at 704 by removing the elastic fasteners from studs 706. The liner insert 74 is removed. The filter disc 72 is removed and regenerated as needed by washing under ordinary tap water.

With the exception of the filter disc, the various parts of the suction device are preferably constructed of hard plastics so that there will be no corrosion or rusting problems as the invention is designed to operate efficiently even when completely submerged. The filter disc may be constructed of any fibrous, compressible material with a pore size of approximately five microns. One type of filter medium which may be employed in the invention is commercially available acrylonitrile-polyvinylchloride copolymer.

The various dimensions of the device are chosen according to the dimensions of the pools or spas to be cleaned.

It is to be understood that the present invention is not limited to the sole embodiment described above, but encompasses any and all embodiments within the scope of the following claims.

I claim:

1. A method of manually cleaning a pool, said method to be performed periodically, said pool having at least a portion of curved periphery with an upper edge and sides extending downwardly therefrom to a bottom, said bottom having a center, said method comprising the following steps:
    mechanically scrubbing said pool in a pattern beginning at said upper edge and continuing unidirectionally in a descending spiral pattern along said sides to said bottom and thence spiraling inwardly toward said bottom center;
    simultaneously inducing a vortex by means of said mechanical scrubbing pattern, said vortex having a center substantially concentric with said pool bottom center, said vortex concentrates substantially all foreign matter at said vortex center;
    manually removing any said foreign matter suspended at said vortex center by straining;
    manually removing any remaining said foreign matter deposited at said pool bottom center from said vortex center by suction means;
    said suction means include a manually operated suction device having an elongated barrel, a first valve means positioned at a lower end of the barrel for permitting upward flow and preventing downward flow of fluids, a manually reciprocable elongated rod slidably mounted axially above the first valve means, a second valve means movably mounted on a lower end of the manually reciprocable rod for lifting water upwardly through the barrel and for creating reduced pressure in an inlet end of the barrel, and a filter element removably positioned below the second valve means.

2. A method of manually cleaning a pool, said method to be performed periodically, said pool having at least a portion of curved periphery with an upper edge and sides extending downwardly therefrom to a bottom, said bottom having a center, said method comprising the following steps:
    mechanically scrubbing said pool in a pattern beginning at said upper edge and continuing unidirectionally in a descending spiral pattern along said sides to said bottom and thence spiraling inwardly toward said bottom center;
    simultaneously inducing a vortex by means of said mechanical scrubbing pattern, said vortex having a center substantially concentric with said pool bottom center, said vortex concentrates substantially all foreign matter at said vortex center;
    manually removing any said foreign matter suspended at said vortex center by straining;
    manually removing any remaining said foreign matter deposited at said pool bottom center from said vortex center by suction means;
    said suction means include a manually operated suction device having an elongated barrel, a first valve means positioned at a lower end of the barrel for permitting upward flow and preventing downward flow of fluids, a manually reciprocable elongated rod slidably mounted axially above the first valve means, a second valve means movably mounted on a lower end of the manually reciprocable rod for lifting water upwardly through the barrel and for creating reduced pressure in an inlet end of the barrel, and a disc shaped filter element removably positioned below the second valve means.

3. A method of manually cleaning a pool, said method to be performed periodically, said pool having at least a portion of curved periphery with an upper edge and sides extending downwardly therefrom to a bottom, said bottom having a center, said method comprising the following steps:
    mechanically scrubbing said pool in a pattern beginning at said upper edge and continuing unidirectionally in a descending spiral pattern along said sides to said bottom and thence spiraling inwardly toward said bottom center;
    simultaneously inducing a vortex by means of said mechanical scrubbing pattern, said vortex having a center substantially concentric with said pool bottom center, said vortex concentrates substantially all foreign matter at said vortex center;
    manually removing any said foreign matter suspended at said vortex center by straining;
    manually removing any remaining said foreign matter deposited at said pool bottom center from said vortex center by suction means;
    said suction means include a manually operated suction device having an elongated barrel, a first valve means positioned at a lower end of the barrel for permitting upward flow and preventing downward flow of fluids, a manually reciprocable elongated rod slidably mounted axially above the first valve means, a second valve means movably mounted on a lower end of the manually reciprocable rod for lifting water upwardly through the barrel and for creating reduced pressure in an inlet end of the barrel, and a disc shaped filter element removably positioned below the second valve means with means to entrain particulates of 5 microns nominal diameter or greater.

* * * * *